United States Patent [19]

Wenzel et al.

[11] Patent Number: 5,426,458
[45] Date of Patent: Jun. 20, 1995

[54] POLY-P-XYLYLENE FILMS AS AN ORIFICE PLATE COATING

[75] Inventors: Donald E. Wenzel; Michael G. Groh, both of Albany, Oreg.

[73] Assignee: Hewlett-Packard Corporation, Palo Alto, Calif.

[21] Appl. No.: 105,074

[22] Filed: Aug. 9, 1993

[51] Int. Cl.⁶ .............................. B41J 2/05; B41J 2/14
[52] U.S. Cl. .................................... 347/45; 29/890.1; 156/60
[58] Field of Search ................ 427/509, 532; 347/45; 29/890.1; 156/182, 60

[56] References Cited

U.S. PATENT DOCUMENTS

| | | | |
|---|---|---|---|
| 4,947,184 | 8/1990 | Moynihan | 347/45 |
| 5,208,606 | 5/1993 | Klein et al. | 347/45 |

FOREIGN PATENT DOCUMENTS

| | | | |
|---|---|---|---|
| 0314486 | 10/1988 | European Pat. Off. | B41J 3/04 |
| 62-156971 | 7/1987 | Japan | B41J 3/04 |
| 01087358 | 9/1987 | Japan | |
| 1087358 | 3/1989 | Japan | B41J 3/04 |
| 03161359 | 11/1989 | Japan | |
| WO89/07752 | 8/1989 | WIPO | B41J 3/04 |

OTHER PUBLICATIONS

"Surface Characterization of Plasma-Treated Poly α p-Xylylene Films" T. E. Nowlin and D. Foss Smith, Jr., Journal of Applied Polymer Science, vol. 25, 1619-1632 (1980).

"Thermal Inkjet Review, or How Do Dots Get from the Pen to the Page?" James P. Shields, Hewlett-Packard Journal, Aug. 1992, p. 67.

*Primary Examiner*—Benjamin R. Fuller
*Assistant Examiner*—Valerie Ann Lund

[57] ABSTRACT

A poly-p-xylylene coating has been found to demonstrate superior properties as a thermal ink-jet adhesive material in combination with resistor assemblies employed in thermal ink-jet printheads. This material evidences better adhesion for securing the orifice plate to the barrier material used to form the ink firing chambers within the printhead and superior corrosion resistance to thermal ink-jet inks, compared to other coating materials.

16 Claims, 2 Drawing Sheets

I

II

III

POLY-P-XYLYLENE FILMS AS AN ORIFICE PLATE COATING

TECHNICAL FIELD

The present invention relates to thermal ink-jet printers, and, more particularly, to printheads incorporating an improved orifice coating for securing the orifice plate to the barrier material used to form the ink firing chamber within the printhead.

BACKGROUND ART

Thermal ink-jet printers offer a low cost, high quality, and comparatively noise free option to other types of printers commonly used with computers. Such printers employ a resistor element in a chamber provided with an egress for ink to enter from a plenum. The plenum is connected to a reservoir for storing the ink. A plurality of such resistor elements are arranged in a particular pattern, called a primitive, in a printhead. Each resistor element is associated with a nozzle in a nozzle plate, through which ink is expelled toward a print medium. The entire assembly of printhead and reservoir comprise an ink-jet pen.

In operation, each resistor element is connected via a conductive trace to a microprocessor, where current carrying signals cause one or more selected elements to heat up. The heating creates a bubble of ink in the chamber, which is expelled through the nozzle toward the print medium. In this way, firing of a plurality of such resistor elements in a particular order in a given primitive forms alphanumeric characters, performs area fill, and provides other print capabilities on the medium.

The present construction of printheads in thermal ink-jet print cartridges employs nickel as the orifice plate material. Since inks corrode nickel, a gold layer (electroplated gold) is formed on the surface of the nickel as a corrosion barrier. The orifice plate is bonded to the barrier layer by a thermal cure cycle.

Problems also exist with the use of adhesives for securing the orifice plate. Adhesives do not provide a uniform coating and often cover the holes in the orifice plate.

A need remains for a material useful in the construction of thermal ink-jet printheads as an orifice coating which improves the securing of the orifice plate to the barrier material, improves corrosion resistance, and eliminates costly gold plating.

DISCLOSURE OF INVENTION

In accordance with the invention, a poly-p-xylylene coating has been found to demonstrate superior properties as a thermal ink-jet orifice coating material to improve securing the orifice plate to the barrier material in combination with resistor assemblies employed in thermal inkjet printheads. This coating material evidences better adhesion for securing the orifice plate to the barrier material used to form the ink firing chamber within the printhead.

Printheads made with the foregoing orifice coating exhibit improved corrosion resistance to ink and no longer require costly gold plating.

BEST MODES FOR CARRYING OUT THE INVENTION

Figure 1:
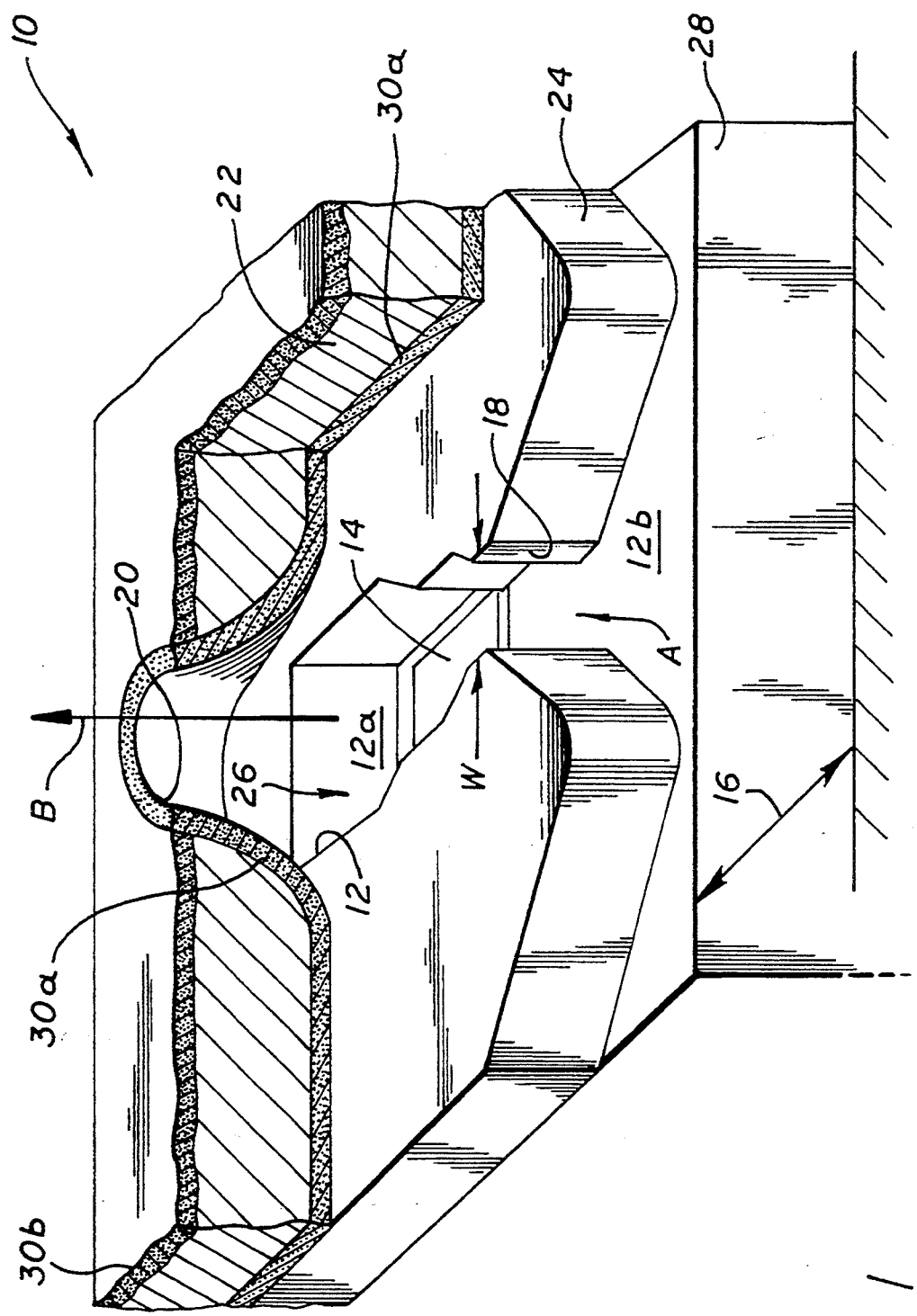
FIG. 1 is a perspective view of a resistor and ink feed channel assembly in a thermal ink-jet printhead which shows the orifice plate coated with a layer of poly-p-xylylene adhering to the barrier layer.

Referring now to FIG. 1, a portion of a printhead is shown comprising a plurality of firing resistors, of which one resistor assembly 10 is depicted. The resistor assembly 10 comprises a barrier inlet channel 12, with a resistor element 14 adjacent to one end 12a thereof. Ink (not shown) is introduced at the opposite end 12b of the channel, as indicated by arrow "A" from an ink refill slot, generally indicated at 16. A constriction 18 near the fluid introduction end 12b may be used for control of hydraulic damping.

Associated with each resistor element 14 is an orifice 20, located above the resistor element in an orifice plate, nozzle plate or top-plate, 22. The diameter of the nozzles typically is in the range of about 25 to 75 $\mu$m, depending on the particular printhead design, which is a function of the frequency at which the printhead is designed to operate, ink viscosity, drop volume, hydraulic damping, etc. The orifice plate 22 typically comprises gold plated, electroformed nickel, about 25 to 75 $\mu$m thick.

Droplets of ink are ejected through the nozzle as indicated by arrow "B" upon heating of a quantity of ink by the resistor element 14. The orifice plate 22 is supported on barrier material 24, which is patterned to define the ink feed channel and the chamber 26 in which the resistor element 14 is located. The barrier material 24 itself is formed on a major surface of a substrate 28, such as silicon.

FIG. 1 depicts one configuration of the resistor assembly, in which an orifice coating layer coats all sides 30a and 30b of the orifice plate and enhances adhesion of the orifice plate 22 to the barrier layer 24.

In accordance with the invention, the coating material 30 consists essentially of a poly-p-xylylene. The poly-p-xylylene is applied to a nickel electroformed orifice plate 22 as a coating ranging from 0.5 to 5 $\mu$m and preferably about 1 to 2 $\mu$m. A coating process similar to chemical vapor deposition is used. The poly-p-xylylene starts as a dimer, it is pyrolyzed, volatilized, and then polymerized onto the nickel surface. The poly-p-xylylene evenly coats the nickel orifice plate, maintaining the openings formed therethrough. The poly-p-xylylene coating is then ashed using argon plasma consisting of 130 watts of forward power, 30 watts of reflected power and 100 volts cathode for 8 minutes or oxygen plasma treatment using oxygen and a REI asher for 5 minutes at 200 watts of power to roughen the surface. The orifice plate is then bonded to the barrier layer 24 by a thermal cure cycle.

Figure 2A:
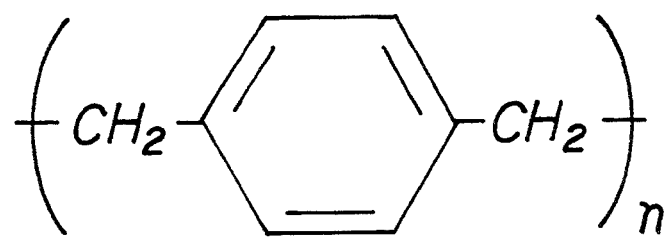
FIGS. 2A–C provide the structures and names of poly-p-xylylenes preferably employed in the practice of the invention.
Figure 2B:
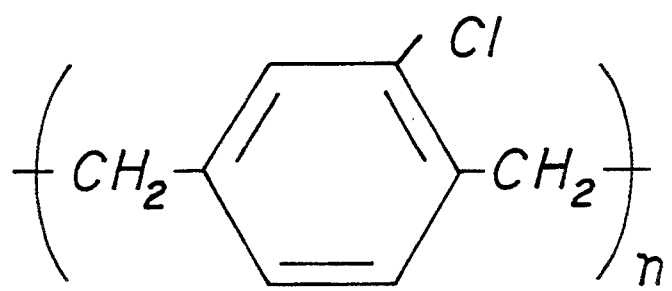
Figure 2C:
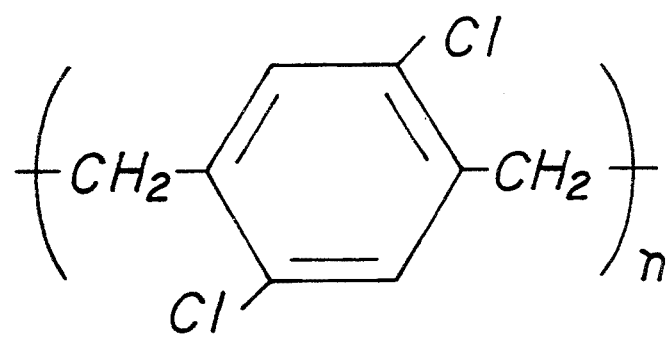

FIGS. 2A–C depict the structures and names of poly-p-xylylenes preferably employed in the practice of the invention. FIG. 2A shows poly-p-xylylene (I), which is available under the tradename Parylene N. FIG. 2B shows poly(monochloro-p-xylylene) (II), which is available under the tradename Parylene C. FIG. 2C shows poly(dichloro-p-xylylene) (III), which is available under the tradename of Parylene D. Of these, poly(monochloro-p-xylylene) (II) is most preferred. In the Tables below, each reference to poly-p-xylylene is actually to the (II) compound.

Table I sets forth a comparison of the orifice plate adhering process of the invention with both the prior art gold plating process and the improved poly-p-xylylene coating process.

TABLE I

Improved Poly-p-xylylene Coating Process of the Invention Compared to Prior Art Gold Coating Process.

| THERMAL CURE | | ORIFICE ADHESION TEST AFTER INK SOAK (1 wk @ 70° C.) | | |
|---|---|---|---|---|
| TEMPERATURE | TIME | INITIAL | INK1 | INK2 |
| Poly-p-xylylene coating | | | | |
| 180° C. | 60 min. | 2.6 | 1.4 | 1.7 |
| 200° C. | 30 min. | 3.8 | 1.0 | 1.6 |
| 220° C. | 30 min. | 4.8 | 1.7 | 1.5 |
| Gold Plating | | | | |
| 180° C. | 60 min. | | 0.7 | 0.6 |
| 200° C. | 30 min. | | 0.9 | 0.7 |
| 220° C. | 30 min. | | 1.0 | 0.6 |

The foregoing Table I provides comparative data for reduced adhesion obtained from an ink soak test, 1 week in duration at 70° C., using two inks with the following compositions:

| | WT % |
|---|---|
| INK1 (BLACK INK) | |
| Black dyes | 2.2 |
| Solvent: 2-pyrrolidone | 7.5 |
| Biocide: Proxel GXL | 0.3 |
| Buffers | 0.4 |
| Minor components | 0.07 |
| Water | 89.5 |
| INK2 (CYAN INK) | |
| Cyan dye: Acid Blue 9 (sodium salt) | 1.9 |
| Solvents: dipropylene glycol | 3.0 |
| trimethylol propane | 15.0 |
| Surfactant | 0.5 |
| Biocide | 0.3 |
| Water | 79.3 |

The higher the ink soak test number, the better. It is seen that poly-p-xylylene results in significantly greater adhesion for all temperature cure conditions (180°, 200°, and 220° C.).

Table II sets forth a comparison of the orifice plate adhering process of the invention with both the prior art gold plating process and the improved poly-p-xylylene coating process where the poly-p-xylylene coating has been ashed prior to bonding to the barrier layer.

TABLE II

Improved Ashed Poly-p-xylylene Coating Process of the Invention Compared to Prior Art Gold Coating Process.

| THERMAL CURE 220° C. | ORIFICE ADHESION TEST AFTER INK SOAK (1 wk @ 70° C.) | | | |
|---|---|---|---|---|
| ORIFICE TYPE | INITIAL | INK1 | INK3 | INK4 |
| Normal Gold | 6.1 | 0.3 | 0.4 | 0.6 |
| Poly-p-xylylene Coated Nickel (as received) | 4.5 | 2.4 | 2.5 | 0.8 |
| Poly-p-xylylene Coated Nickel (ashed) | 5.0 | 3.8 | 3.6 | 4.0 |

The foregoing Table II provides comparative data for reduced adhesion obtained from an ink soak test, 1 week in duration at 70° C., using three inks with the following compositions:

| | WT % |
|---|---|
| INK3 (YELLOW INK) | |
| Yellow dye: Acid Yellow 23, tetramethyl ammonium salt | 2.6 |
| Solvents: dipropylene glycol | 3.0 |
| trimethylol propane | 15.0 |
| Surfactant | 0.5 |
| Biocide | 0.3 |
| Water | 78.6 |
| INK4 (BLACK PIGMENT-BASE INK) | |
| Pigment | 3.6 |
| Dispersant | 1.8 |
| Solvents: diethylene glycol | 5.7 |
| LEG-1 | 5.7 |
| Biocide | 0.3 |
| Water | 82.9 |

(see U.S. Pat. No. 5,085,698).

As above, the higher the ink soak test number, the better. The ashed poly-p-xylylene results in a significantly greater adhesion than either the gold coating or the poly-p-xylylene coating without ashing.

The significantly improved adhesion of the orifice plate to the barrier layer results from the use of an ashed poly-p-xylylene coating applied to the orifice plate. The poly-p-xylylene coating replaces the costly gold coating and improves the reliability of the thermal ink-jet printhead. The improved chemical resistance of the poly-p-xylylene coating allows the use of a large number of thermal ink-jet inks for letter quality black and color text and graphics printing. The poly-p-xylylene coating material is very durable and abrasion resistant. Table III provides supporting data from a Wiper Test.

Wipers are an integral part of an ink-jet printer. The wiper is used to remove clogs in the ink-jet cartridge by wiping across the surface. The surface coating of the printhead must be durable and wear resistant to withstand this wiping action. A typical printhead might receive 5,000 wipes in its lifetime. Additional wipes are provided to ensure product margin.

TABLE III

Wiper Test.

| No. of Wipes | Pen Type | No. of pens tested | Test | % Failure |
|---|---|---|---|---|
| 10,000 | Gold control | 4 | 1 | 0 (pass) |
| 10,000 | Poly-p-xylylene coated | 4 | 1 | 0 (pass) |
| 12,000 | gold control | 5 | 2 | 0 (pass) |
| 12,000 | poly-p-xylylene coated | 5 | 2 | 0 (pass) |

INK1 is very corrosive to nickel. An accelerated storage test revealed that a 1 μm thickness of the poly-p-xylylene coating material is required for corrosion resistance. Table IV provides data from an Accelerated Storage Life Test for INK1.

TABLE IV

Accelerated Storage Life Testing.

| poly-p-xylylene Thickness (μm) | INK1 | |
|---|---|---|
| | 60° C., 6 weeks | 70° C., 3 weeks |
| 0.5 | 85% failure | 60% failure |
| 1.0 | 10% failure | 10% failure |
| 3.0 | 0 | 0 |
| 1 μm Thick Gold Controls | 0 | 0 |

Table IV shows that if the poly-p-xylylene is too thin, approximately 1.0 micrometer or less thick, then corrosion failures occur.

INDUSTRIAL APPLICABILITY

Adhesive material comprising the poly-p-xylylene layer set forth herein is expected to find use in the manufacture of thermal ink-jet printheads.

Thus, there has been disclosed a process of fabricating thermal ink-jet printheads for thermal ink-jet printers. Various changes and modifications of an obvious nature will be readily apparent to those skilled in this art, and all such changes and modifications are considered to fall within the scope of the invention as defined by the appended claims.

What is claimed is:

1. An improved method of making thermal ink-jet printheads for thermal ink-jet printers, said thermal-ink printhead constructed by providing a plurality of resistor elements, each resistor element defining a geometric plane and formed in an ink firing chamber into which ink is periodically introduced from a plenum and from which ink is periodically ejected through a nozzle comprising orifices disposed in an orifice plate above said elements, said ink firing chamber defined by a barrier material each orifice associated with a resistor element for firing a quantity of ink normal to the geometric plane of each said resistor element and through said orifices toward a print medium in defined patterns to form alphanumeric characters and graphics thereon, wherein the improvement comprises the step of securing the orifice plate to the barrier material used to form the ink firing chambers with a coating consisting essentially of a poly-p-xylylene.

2. The method of claim 1 wherein said orifice plate consists essentially of electroformed nickel.

3. The method of claim 2 wherein said orifice plate ranges in thickness from 25 to 75 μm.

4. The method of claim 1 wherein said orifice plate has both a top surface and a bottom surface, and wherein said poly-p-xylylene is applied onto both said top and bottom surfaces of said orifice plate.

5. The method of claim 4 wherein said coating ranges from about 0.5 to 5 μm thick.

6. The method of claim 5 wherein said coating ranges from about 1 to 2 μm thick.

7. The method of claim 6 wherein said coating on said orifice plate is ashed by using an argon or oxygen plasma treatment prior to securing said cover plate to said barrier material.

8. The method of claim 1 wherein said coating consists essentially of a poly-p-xylylene selected from the group consisting of poly-p-xylylene, poly(monochloro-p-xylylene), and poly(dichloro-p-xylylene).

9. The method of claim 8 wherein said coating consists essentially of poly(monochloro-p-xylylene).

10. A thermal ink-jet printhead including:
   (a) a substrate;
   (b) a barrier layer supported thereon provided with openings to define a firing chamber having a resistor element therein and barrier inlet channel to introduce ink from an ink refill slot to said firing chamber; and
   (c) an orifice plate having a top surface and a bottom surface and provided with a plurality of nozzles, each nozzle associated with a resistor element, said bottom surface of said orifice plate secured to said barrier layer by a coating of a poly-p-xylylene, and said top surface of said orifice plate provided with a coating of a poly-p-xylylene.

11. The thermal ink-jet printhead of claim 10 wherein said orifice plate consists essentially of electroformed nickel.

12. The thermal ink-jet printhead of claim 11 wherein said orifice plate material ranges from 25 to 75 μm thick.

13. The thermal ink-jet printhead of claim 10 wherein said coating ranges from about 0.5 to 5 μm thick.

14. The thermal ink-jet printhead of claim 10 wherein said coating ranges from about 1 to 2 μm thick.

15. The thermal ink-jet printhead of claim 14 wherein said coating consists essentially of a poly-p-xylylene selected from the group consisting of poly-p-xylylene, poly(monochloro-p-xylylene), and poly(dichloro-p-xylylene).

16. The thermal ink-jet printhead of claim 15 wherein said coating consists essentially of poly(monochloro-p-xylylene).

* * * * *